July 2, 1968  B. MOKRYTZKI  3,391,328

INCREASED EFFICIENCY COMMUTATION CIRCUIT FOR THYRISTORS

Filed Sept. 6, 1966  2 Sheets-Sheet 1

INVENTOR.
BORIS MOKRYTZKI
BY
Woodling, Krost, Granger & Rust
ATTORNEYS

INVENTOR.
BORIS MOKRYTZKI

United States Patent Office 3,391,328
Patented July 2, 1968

3,391,328
INCREASED EFFICIENCY COMMUTATION
CIRCUIT FOR THYRISTORS
Boris Mokrytzki, Kirtland, Ohio, assignor to Reliance Electric and Engineering Company, a corporation of Ohio
Filed Sept. 6, 1966, Ser. No. 577,324
10 Claims. (Cl. 321—45)

The invention relates in general to commutation circuits for controllable unidirectional current conducting devices such as thyristors and more particularly to a forced commutation circuit for a thyristor forming by use of a commutating capacitor.

Unidirectional current conducting devices of the semiconductor type include those which are gate turn-on devices and which will continue to conduct because of self-generation within the device as long as the anode-cathode current persists. Thyristors, formerly called silicon controlled rectifiers, are devices within this class. In some circuits, such as rectifier circuits supplying a direct current load from an alternating current source, there is natural commutation of such devices by the reversal of the supply voltage such that the anode-cathode voltage inherently goes negative or to zero periodically to extinguish the semi-conductor device. However, in other circuits such as inverters which produce a non-synchronous alternating current from a direct current source, for example, there is no natural commutation because the supply voltage does not periodically go negative and hence forced commutation to de-ionize or extinguish the device is used on such inverter circuits.

A forced commutation circuit utilizing the voltage across a commutating capacitor to force the commutation or periodic extinguishing of the thyristor is shown in the McMurray Patent No. 3,207,974. Such commutation circuit was used in an inverter and utilized a load current carrying thyristor plus a commutating thyristor in circuit with a commutating capacitor to periodically apply to the load a pulse of current in such a manner to divert or replace that portion of the load current flowing through the load carrying thyristor, bringing its current to zero for a sufficiently long time to extinguish that thyristor. Such circuits had the disadvantage of having usually large voltage swings on the commutating capacitor which gradually built up in magnitude. Moreover, in such prior art inverter circuits the commutating capacitor, being in series with a commutating inductance, had a sinusoidal discharge current at the commutating frequency and this sinusoidal current is not completely effective because during a first interval of time both time and capacitor charge are wasted as the current builds up to the commutating level. Also during a second time interval the current is larger than necessary for the commutation requiring increased ratings of the commutation elements and again wasting capacitor charge. During a third time interval the capacitor charges to the negative of the supply voltage which is inevitable for most loads which are inductive. During a fourth interval of time, time is again wasted as the capacitor continues to charge in the negative direction to an even larger total voltage and the circuit relaxes. Thus in such prior art circuits there is a definite wasting of time, capacitor charge and voltage rating on the individual circuit components. The wasting of time is important at high switching frequencies.

The invention may be incorporated in a commutation circuit for a thyristor operable from a voltage source to supply energy to load terminals comprising, in combination, a first thyristor connected to supply energy from the voltage source to the load terminals, means to fire said thyristor to conduct current, commutating capacitance means, first circuit means to charge said capacitance means in a given polarity, a second commutating thyristor, second circuit means connecting said second thyristor and said commutating capacitance means to pass current to the load terminals in addition to the load current through said first thyristor to decrease the load requirements through said first thyristor to the point of extinguishing the current through said first thyristor, a reactive network, said commutative capacitance means being included in said reactive network, and said reactive network including a plurality of paths therethrough effectively connected in parallel with each other and each including at least a portion of said capacitance means and inductance means, each of said paths being tuned to a different harmonic of the commutating frequency, the fundamental commutating frequency being determined by the series resonant frequency of said commutative capacitance means and said inductance means in one of said paths.

Accordingly an object of the invention is to provide a circuit obviating the above-mentioned disadvantages.

Another object of the invention is to provide a commutation circuit for a thyristor which will achieve commutation in a shorter time thus permitting higher switching frequencies.

Another object of the invention is to provide a commutation circuit for a semi-conductor device wherein the commutation current is limited in magnitude to that which approaches the level required for safe commutation to minimize wasted current in the circuit and hence to increase the efficiency.

Another object of the invention is to provide a commutation circuit for a semi-conductor device or thyratron device wherein the charge on the capacitor is limited to that which approaches the level required for safe commutation so that the capacitor charge is not wasted.

Other objects and a fuller understanding of the invention may be had by referring to the following description and claims, taken in conjunction with the accompanying drawings, in which:

FIGURE 1 illustrates an inverter circuit which incorporates the invention. However, this is merely one specific example of a forced commutation circuit for a controllable unidirectional current conducting device utilizing a charge on a capacitor and the scope of the invention is not to be limited by the disclosure of FIGURE 1 but only by the scope of the hereinafter appended claims.

Figure 1:
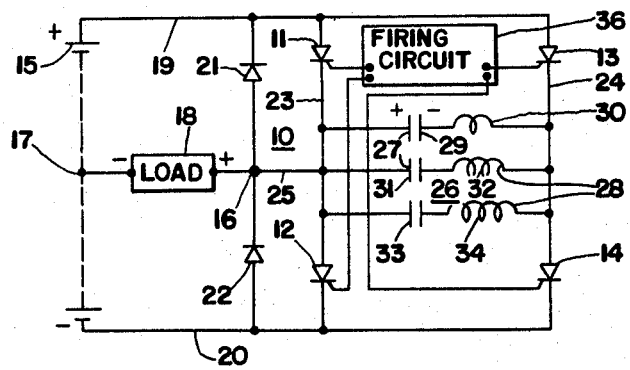
FIGURE 1 is a schematic diagram of the preferred embodiment of the invention.

FIGURE 1 shows an inverter circuit 10 which includes unidirectional current conducting devices 11, 12, 13 and 14. These devices may be semiconductor controlled devices such as gate turn-on devices and are illustrated as thyristors. These thyristors control the flow of energy from a voltage source 15 to load terminals 16 and 17 of a load 18. A positive bus 19 and a negative bus 20 are connected to the positive and negative terminals of the voltage source 15 which has been illustrated as a direct current source. The thyristors 11 and 12 are connected in series by a conductor 23 with the polarity such that conduction is from the positive bus 19 toward the negative bus 20. The thyristors 13 and 14 are connected in series by a conductor 24 with the polarity such that conduction is from the positive bus 19 toward the negative bus 20. Diodes 21 and 22 are connected in series at the load terminal 16 with polarity such that conduction is from the negative bus 20 toward the positive bus 19. A conductor 25 interconnects conductor 23 and load terminal 16 and a reactive network 26 interconnects conductors 23 and 24. This reactive network includes commutative capacitance means 27 and inductance means 28. More specifically, the reactive network 26 includes a plurality of series combinations or series paths of inductance and capacitance means. Three such series combinations are shown as an example. A first path includes a capacitance 29 and an inductance 30, a second path include a capacitance 31 and an inductance 32, and a third path includes a capacitance 33 and an inductance 34. A firing circuit 36 is connected to fire the various controlled conducting devices 11–14 in the proper sequence.

*Operation*

In the inverter circuit of FIGURE 1 the thyristors 11 and 12 are the main or load current carrying thyristors conducting current from the voltage source 15 to the load 18. This inverter circuit 10 is an example of a forced commutation circuit rather than a natural commutation circuit wherein commutation of the thyristors 11 and 12 would be accomplished by periodical reversal of the voltage source. In this case the voltage source 15 is a direct current source and hence the anode-cathode voltage on the thyristors 11 and 12 will not be reversed to periodically extinguish such thyristors. Accordingly, this inverter circuit 10 is an example of a circuit requiring forced commutation in order to extinguish the respective controlled conducting device illustrated as a thyristor even though the anode-cathode voltage remains positive.

The cycle of operation may be explained starting with the thyristors 11 as the main load current carrying thyristor conducting at that instant. Current then flows from the positive bus 19 through thyristor 11 and load 18 back to the source 15. This makes load terminal 16 positive relative to load terminal 17. In order to extinguish or turn-off this thyristor 11 it is necessary to in some manner cause the current flow therethrough to stop for a certain finite time which may be in the order of 20 or 30 microseconds and may be in the range of 10 to 100 microseconds. This establishes sufficient time for the self-generation of current flow at the junction in the semi-conductor device to cease so that upon re-application of positive anode-cathode voltage the device will not again conduct and instead will hold-off conduction.

Figure 4:
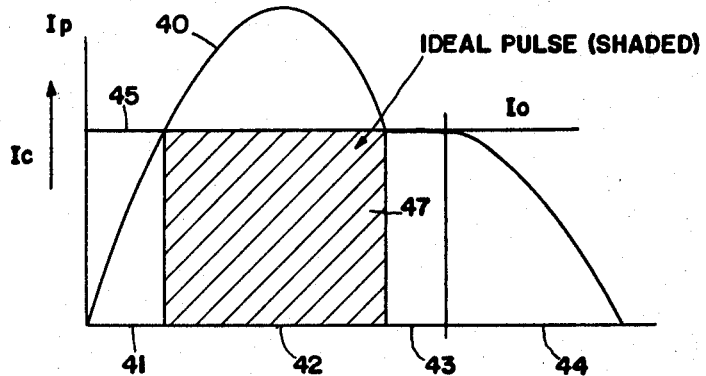

Various commutation circuits may be used and the one shown in FIGURE 1 is to have the commutating thyristor 13 triggered to conduct current. Prior to this triggering, the commutating capacitive means 27 in the reactive network 26 will have previously been charged so that the terminal of the capacitive means 27 connected to conductor 23 will be positive. Then when thyristor 13 is triggered to conduct the positive voltage on the positive bus 19 plus the positive voltage from capacitive means 27 will together combine to provide a pulse of current 40 as shown in FIGURE 4. This would be the case assuming that only one of the series combinations 29–30 were present in the circuit. This current pulse 40 is divided into four different time intervals 41–44 as indicated along the abscissa. During the first interval 41 the sinusoidal current is building up to a level 45 which is assumed to be the load current $I_o$ into an inductive load which attempts to maintain a constant input current. Because the capacitance means 29 and inductance means 30 are series resonant at a commutating frequency, the current pulse 40 will attempt to be a sinusoidal current. Commutation is being achieved when the current through the capacitor 29 and thyristor 13 is greater than the load current $I_o$. The small drop of diode 21 is assumed negligible.

Figure 5:
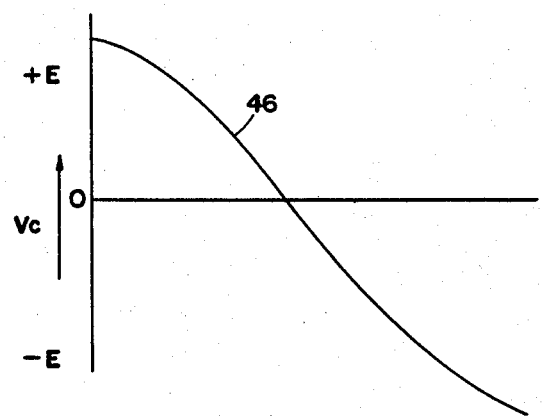

During the first time interval 41 the sinusoidal current 40 is not completely effective because both time and charge are wasted as the current builds up to the commutation level. During the second time interval 42 the current 40 is greater than necessary for the commutation, calling for increased current ratings of the commutating elements 13, 29, 11 and 21, and again wasting charge on the capacitor 29. However during this second time interval 42 the current through the commutating thyristor 13 is now greater than that required by the load 18 and accordingly current through the main load current carrying through 11 will be extinguished. If the second time interval 42 is of a sufficient length of time, for that particular thyristor 11, for example 10 to 100 microseconds, then it will be extinguished and will hold-off conduction despite later imposition of positive anode-cathode voltage. This extra current flow 48 during the second time interval 42 which is in excess of the load current requirements will flow through the diode 21 in a series loop path with thyristor 13 and inductance 30 and capacitor 29 which wastes this current. During the third interval 43, the capacitor charges to the negative of the supply voltage as shown by curve 46 in FIGURE 5, which in inevitable. This is because the load 18, which is assumed highly inductive, now does not want to have this current interrupted and accordingly the capacitor 29 is charged with a negative potential on conductor 23. This negative charging is of course also essential for the subsequent commutation of thyristor 12 by the commutating thyristor 14. During the fourth time interval 44 time is again wasted as the capacitor 29 continues to charge in a negative direction and the circuit relaxes.

Figure 6:
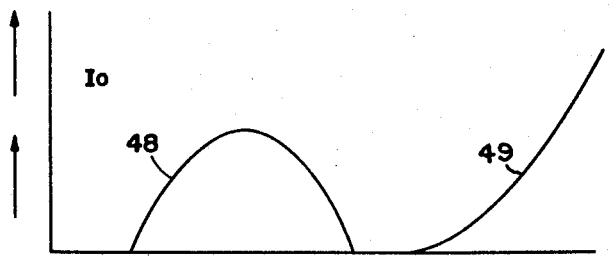

FIGURE 6 shows the circuit flow 48 through the diode 21 during the second time interval 42 and current flow 49 in diode 22 during the fourth time interval 44 when the conductor 23 side of capacitor 29 has become more negative than the negative bus 20.

The shaded area 47 is a rectangular pulse which produces the same turn-off of thyristor 13 but requires considerably less RMS rating of the commutating elements, less charge and less time which is important at high switching frequencies, for example 5 to 10 kHz.

The rectangular current pulse 47 of FIGURE 4 can be represented in a Fourier series of the type $$I_c = I_1 \left( \sin \omega t + \frac{\sin 3\omega t}{3} \cdots \frac{\sin n\omega t}{n} \cdots \right) \quad (1)$$

wherein $I_c$ is the current through the commutating capacitance 27. This pulse may be approximated by truncating the series after a few terms, the fewer the better as related to circuit complexity.

Figure 3:
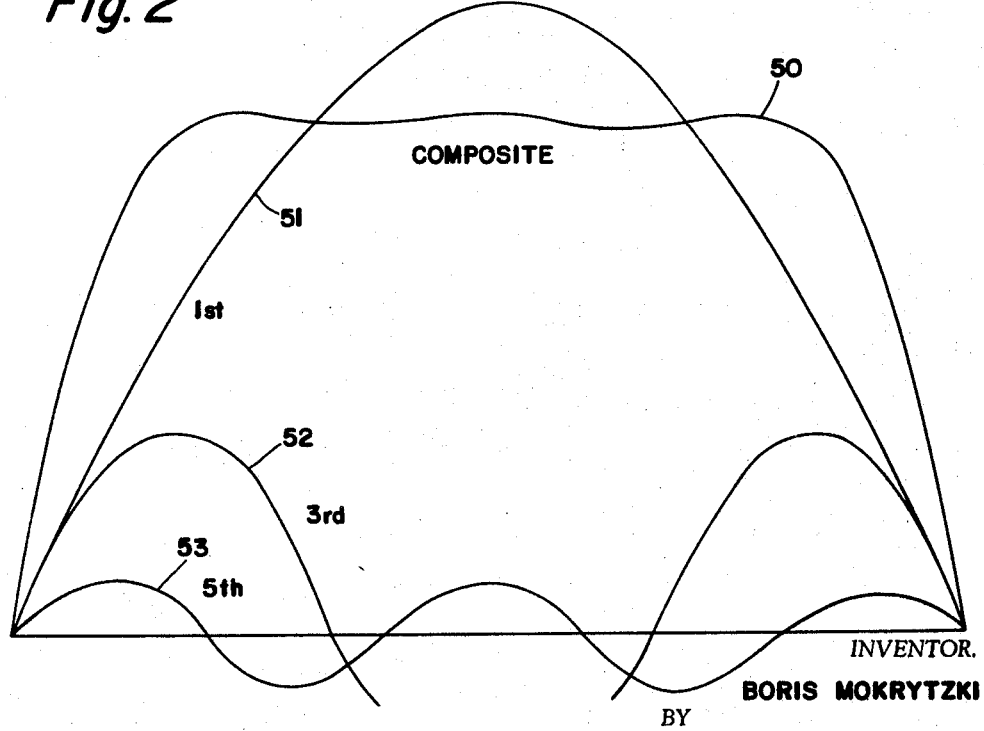
FIGURES 3–6 are graphs of voltage and current vs. time explaining the operation of the circuit.

FIGURE 3 shows an approximation of the rectangular pulse using three terms, namely the first, third and fifth harmonics in slightly different proportions as follows:

$$I_c = I_1 \left( \sin \omega t + \frac{.8 \sin 3\omega t}{3} + \frac{.5 \sin 5\omega t}{5} \right) \quad (2)$$

The list of additional multipliers less than unity for each of the harmonic terms in this truncated Fourier series, has been found to produce a flatter top on the pulse 50, flat to within about 5 percent.

The pulse 50 in FIGURE 3 is therefore a composite of the first harmonic 51, the third harmonic 52 and the fifth harmonic 53 in the proportions shown in Equation 2. The top of the composite current wave 50 is flat within a few percent and the sides or leading and trailing edges are fairly steep. This wave form 50 can be achieved by the circuit of FIGURE 1 namely by using the reactive network 26. This includes the three series combinations 29–30, 31–32 and 33–34 of capacitance and inductance. The first series combination 29–30 may be tuned to the fundamental or first harmonic, the second series combination 31–32 may be tuned to the third harmonic and the third combination 33–34 may be tuned to the fifth harmonic of the commutation frequency.

The frequency of each resonant path may be adjusted by the factor $1/\sqrt{LC}$ and the amplitude of the contribution of the total pulse by the factor $\sqrt{C/L}$. These parameters can of course be independent of each other. More than three resonant paths of course may be used but become less practical and in fact only two resonant paths may be sufficient in some case. If damping occurs in the circuit because of resistance, or other means, this tends to place a small negative slope on the top of the rectangular pulse 50 but this can normally be tolerated at a slight loss of commutation ability. However, the Q of the high frequency circuits can be increased by the use of Litz wire or by increased amounts of copper, because the current level therein will be much lower than the fundamental frequency circuits.

After the commutation thyristor 13 has extinguished the main thyristor 11, then the complementary load current carrying thyristor 12 will be fired by the firing circuit 36. This then carries the load current in the opposite direction making load terminal 16 negative relative to load terminal 17. Actually in the case of an inductive load 18, the polarity of load terminals will be reversed to be negative at terminal 16 at the time when diode 22 starts to conduct as caused by the inductance of the load 18 maintaining a continuation of current through the commutating capacitance 29 which has caused the capacitance terminal 23 to be negative, as described above. Accordingly, the polarity of the load 18 will be switched at this instant.

Now with load carrying thyristor 12 carrying the load, the next commutation will be to extinguish this thyristor 12. This is accomplished by the selective firing of the commutating thyristor 14 which will conduct because the conductor 24 end and capacitor 29 will now be positive. The commutation will now take place with the inverse of the curves shown in FIGURES 4, 5 and 6 and in the manner described above for commutation of thyristor 12.

Figure 2:
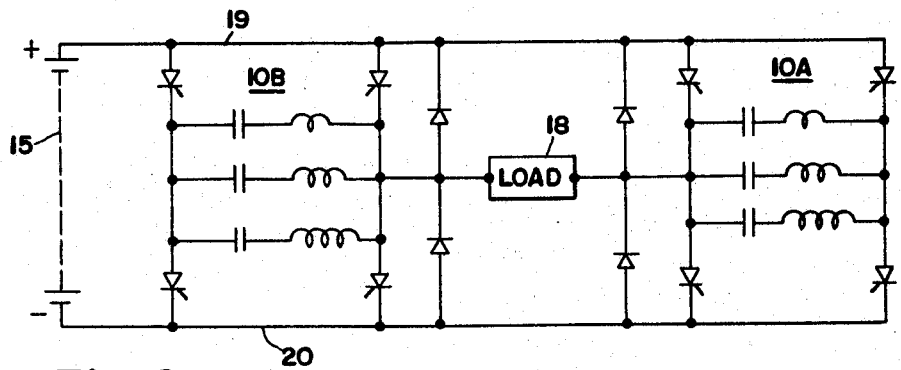
FIGURE 2 is a schematic diagram of a modification of the invention.

FIGURE 2 illustrates an inverter circuit which includes a circuit 10A substantially identical to the inverter circuit 10 of FIGURE 1 and in addition, a circuit 10B which again is the same circuit except shown in reverse. These two circuits 10A and 10B are again energized from the positive and negative buses 19 and 20 and energizes the load 18 in a form of bridge circuit. Accordingly it is not necessary to have a center-tapped direct current source 15. Also it will be understood that three or more such circuits like circuit 10 may be provided to supply a multi-phase load. The inverter circuit 10 of FIGURE 1 may thus be considered to be a complete single phase circuit or to be merely one phase of a multi-phase circuit.

The invention provides a commutation circuit which produces a current pulse which is closer to being rectangular than the normal sine wave of an L–C resonant circuit. The rectangular current pulse 50 because of its short duration and flat top is highly effective in commutation. It is produced by a simple, practical and inexpensive circuit. This circuit will thus shorten the first and third time intervals 41 and 43 to thus permit higher switching frequencies. It also lowers the maximum amplitude of the current pulse 40 so that the current rating on the thyristor 13, diode 21 and capacitor 27 may be decreased. This makes the commutation circuit less expensive. Also the charge on the capacitors 29, 31 and 33 is utilized more effectively and less of such charge is wasted.

Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereafter claimed.

What is claimed is:
1. A commutation circuit for a thyristor operable from a voltage source to supply energy to load terminals comprising, in combination,
    a first thyristor connected to supply energy from the voltage source to the load terminals,
    means to fire said thyristor to conduct current,
    commutating capacitance means,
    first circuit means to charge said capacitance means in a given polarity,
    a second commutating thyristor,
    second circuit means connecting said second thyristor and said commutating capacitance means to pass current to the load terminals in addition to the load current through said first thyristor to decrease the load requirements through said first thyristor to the point of extinguishing the current through said first thyristor,
    a reactive network,
    said commutative capacitance means being included in said reactive network,
    and said reactive network including a plurality of paths therethrough effectively connected in parallel with each other and each including at least a portion of said capacitance means and inductance means, each of said paths being tuned to a different harmonic of the commutating frequency, the fundamental commutating frequency being determined by the series resonant frequency of said commutative capacitance means and said inductance means in one of said paths.

2. A commutation circuit as defined in claim 1 including a diode connected in said second circuit means to provide a series loop path through said second thyristor and said commutative capacitance means.

3. A commutation circuit as defined in claim 1 including third and fourth thyristors,
    means connecting said third thyristor to conduct load current,
    means connecting said fourth thyristor as a commutation thyristor to extinguish current flow through said third thyristor,
    and said first circuit means to charge said commutative capacitance means in a given polarity including said third thyristor.

4. A commutation circuit for use with a voltage source and load terminals comprising, in combination,
    a load current carrying thyristor,
    means connecting said thyristor to supply energy to the load terminals from the voltage source,
    a commutating thyristor for said load carrying thyristor,
    a reactive network including inductance means and commutating capacitance means,
    means connecting at least part of said reactive network in a series loop path for said commutating thyristor to apply to the load terminals an additive current from said commutating capacitance means to said load carrying thyristor to extinguish said thyristor,
    said reactive network including a plurality of series connected inductive and capacitive means therein with said series combinations being connected in parallel,
    a first of said inductor-capacitor series combinations being tuned to the fundamental of the commutating frequency,
    and each of the remaining of said plurality of inductor-capacitor series combinations being tuned to a harmonic ($2n-1$) times the commutating frequency, wherein $n$ is any positive integer, whereby said reactive network provides more nearly a rectangular wave than a sine wave of a pulse of current to extinguish said thyristor.

5. A commutation circuit as defined in claim 4 wherein said inductance-capacitance series combinations are tuned to the various harmonics in accordance generally with a Fourier series of a rectangular wave, and each of the terms of the Fourier series has an additional multiplier.

6. A commutation circuit as defined in claim 4 wherein there are three inductor-capacitor series combinations and the first series combination is tuned to the fundamental of the commutating frequency, the second of said inductor-capacitor series combinations is tuned to the third harmonic of the commutating frequency and the third of said inductor-capacitor series combinations is tuned to the fifth harmonic of the commutating frequency.

7. A commutation circuit as defined in claim 6 wherein the plurality of series combinations are tuned to the various harmonics in accordance generally with the Fourier series of a rectangular wave.

8. A commutation circuit as defined in claim 6 wherein said series combinations are three in number and the generally rectangular wave is derived in accordance with $$I_c = I_1 \left( \sin \omega t + \frac{8}{10} \frac{\sin 3\omega t}{3} + \frac{5}{10} \frac{\sin 5\omega t}{5} \right)$$

where $I_c$ is the current through said commutating capacitance means.

9. A commutation circuit as defined in claim 4 including a second load carrying thyristor,
a second commutating thyristor,
means connecting said second load current carrying thyristor to supply energy to the load terminals from the voltage source of a polarity opposite to that of the first load current carrying thyristor,
and means connecting at least part of said reactive network in a series loop path for said second commutation thyristor to apply to the load terminals an additive current from said commutating capacitance means to said second load current carrying thyristor to extinguish such thyristor.

10. A commutation circuit as defined in claim 4 including a diode, and means effectively connecting said diode in reverse parallel connection across said load current carrying thyristor.

References Cited

UNITED STATES PATENTS

| 3,124,740 | 3/1964 | Corey et al. | 321—45 |
| 3,207,974 | 9/1965 | McMurray | 321—45 |
| 3,249,844 | 5/1966 | Jensen | 321—44 |
| 3,303,406 | 2/1967 | Bedford | 321—44 |
| 3,303,407 | 2/1967 | Depenbrock et al. | 321—45 |

JOHN F. COUCH, *Primary Examiner.*

WARREN E. RAY, *Examiner.*

W. M. SHOOP, *Assistant Examiner.*